United States Patent
Monk

(10) Patent No.: US 7,372,661 B2
(45) Date of Patent: May 13, 2008

(54) TAPE GUIDE SYSTEM FOR ENGAGING DIFFERENT TAPE WIDTHS

(75) Inventor: Russell Ian Monk, Caldicot (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 462 days.

(21) Appl. No.: 11/118,879

(22) Filed: Apr. 29, 2005

(65) Prior Publication Data

US 2005/0248874 A1    Nov. 10, 2005

(30) Foreign Application Priority Data

Apr. 30, 2004  (GB) ................. 0409668.1

(51) Int. Cl.
*G11B 5/027* (2006.01)
(52) U.S. Cl. .................. 360/95; 360/85
(58) Field of Classification Search .......... 360/85, 360/95
See application file for complete search history.

(56) References Cited

U.S. PATENT DOCUMENTS

| | | | |
|---|---|---|---|
| 4,709,280 A | 11/1987 | Delacou | |
| 5,550,686 A * | 8/1996 | Matsuoka et al. | 360/85 |
| 5,682,285 A * | 10/1997 | Saga et al. | 360/130.21 |
| 5,717,539 A | 2/1998 | Takada | |
| 6,678,111 B1 * | 1/2004 | Tatsumi et al. | 360/85 |
| 7,239,473 B2 * | 7/2007 | Kondo | 360/85 |
| 2003/0197973 A1 * | 10/2003 | Matsuoka et al. | 360/85 |
| 2005/0180050 A1 * | 8/2005 | Cho | 360/130.23 |
| 2005/0248875 A1 * | 11/2005 | Monk | 360/85 |

FOREIGN PATENT DOCUMENTS

| | | |
|---|---|---|
| EP | 0125700 | 11/1984 |
| EP | 0 329 180 | 2/1989 |
| EP | 329180 | 8/1989 |
| EP | 0 509 320 | 4/1992 |
| EP | 0745988 | 12/1996 |
| GB | 2087629 | 5/1982 |
| JP | 2000-306290 | 11/2000 |

* cited by examiner

*Primary Examiner*—Brian E. Miller

(57) ABSTRACT

A tape guide system for supporting magnetic tape about a rotary scan drum of a data transfer apparatus is disclosed. The tape guide system comprises a tape guide and a guide ramp. The tape guide has a supporting surface for supporting the magnetic tape in the tape guide's deployed position and has a non-deployed position in which the supporting surface is spaced from and non-aligned with a surface of the tape to be supported. The tape guide is arranged to be driven relative to the guide ramp towards the deployed position with a horizontal movement component, thereby causing the guide ramp to impart a vertical movement to the tape guide and, in the deployed position, substantially align at least part of the supporting surface of the tape guide with the surface of the tape to be supported. Other systems and methods are also provided.

23 Claims, 7 Drawing Sheets

TAPE GUIDE SYSTEM FOR ENGAGING DIFFERENT TAPE WIDTHS

CLAIM TO PRIORITY

This application claims priority to copending United Kingdom application entitled, "Tape Guide System," having serial number GB 0409668.1, filed Apr. 30, 2004, which is entirely incorporated herein by reference.

TECHNICAL FIELD

The present disclosure relates to a tape guide system for a magnetic tape rotary scan data transfer apparatus.

BACKGROUND OF THE INVENTION

Magnetic tape is commonly used for storage of digital data. The digital data is accessed by a data transfer apparatus, which can perform one or both of storing (writing) data onto the tape, or accessing (reading) data previously stored on the tape. A generic term for a magnetic tape data transfer apparatus is a "tape drive." A tape drive normally includes a tape head for one or both of reading and/or writing data from or to the magnetic tape. The tape head itself includes one or more tape head elements, which can perform one or both of these functions.

One type of head used in tape drives is a rotary scan head (also known as a helical scan head). Typically, the rotary scan head is in the form of a drum 80. As shown in FIG. 1, the drum 80 has one or more head elements 90 positioned on its cylindrical surface for performing read and/or write operations. During a loading process of a tape cartridge holding tape for use by the tape drive, a portion of the tape 100 is deployed around the drum 80. During reading and/or writing, the tape 100 is moved in a direction A whilst the drum 80 rotates about an axis B. The drum 80 typically rotates much faster that the speed of movement of the tape 100 so that tracks 101 can be read from, or written to, the tape 100 by the head element 90.

Tape drives using a rotary scan head typically include one or more tape guides in the form of a tape guide assembly. An example tape cartridge 110 and guide assembly 10 for a tape drive is shown in FIGS. 2 and 2a. The tape guide assembly 10 is used to deploy the tape 100 from within the tape cartridge 110 so that at least a portion of the tape is threaded around at least part of the drum 80. The tape guide assembly 10 is also used during reading and/or writing to direct, align, and support the tape 100 as it is moved across the drum 80. The tape guides can either be fixed or stationary guides, such as spindles, or rollers, which roll with the tape as the tape moves across the tape head. The tape guides help to align the tape 100 with respect to the drum 80 and may also include flanges 45, 50 to prevent excess lateral movement of the tape. The guides can include powered rollers to assist in transport of the tape across the drum and to provide proper tensioning of the tape.

The guide assembly 10 shown in FIGS. 2 and 2a includes tape guides in the form of a capstan 30, a pinch roller 20, a number of guide posts 40, 50, and a number of inclined posts 60, 70. The guide posts 40, 50 and pinch roller 20 engage the tape 100 within a tape cartridge 110 or other carrier during a loading process. During a deployment process, the guide posts 40, 50 and pinch roller 20 are moved from their respective non-deployed positions (shown in FIG. 2) engaging the tape 100 and moving along predetermined guide travel paths to respective deployed positions (shown in FIG. 2a). In this manner, a portion of the tape 100 is extracted from the tape cartridge 110 and is deployed around the drum 80. In its deployed position, the tape 100 is sandwiched by the capstan 30 and the pinch roller 20.

Flanges 45, 55 are typically provided on the top and bottom of the guide posts 40, 50 respectively to restrict lateral movement of the tape 100 with respect to the drum 80. The inclined post 60 is positioned so as to incline the tape with respect to drum 80 when threading onto the drum 80 and the inclined post 70 is positioned to return the tape 100 to the non-inclined position when threading off of the drum 80.

Rotary scan tape drives are designed to use a predetermined size and type of tape cartridge that contains a predetermined length of a predetermined width tape. In this manner, the designer of the tape drive knows the size of the cartridge and the width (w) of tape that must be accommodated and can therefore dimension and position the tape guides and flanges appropriately. The width (w) of the tape typically corresponds to the height (h) of the tape guides, so that the tape is aligned with respect to the drum 80 and its head element(s) 90 by the flanges 45, 55 of the guides.

One format for data storage using a rotary scan tape drive is Digital Data Storage (DDS). Various versions of DDS exist and although each version uses the same (approximately 4 mm) width tape in the same Digital Audio Tape (DAT) cartridges, increasingly advanced reading and writing techniques have been used in later versions to achieve greater data storage capacity from the same media as earlier versions. Customers are demanding more and more data storage capacity and in the past, the use of such advanced reading and writing techniques have addressed (at least to some extent) those demands. However, for practical purposes, the storage capacity of a given size of tape is ultimately limited by the available surface area of the tape.

Instead of trying to cram more data onto the same sized tape, one option is to apply the DDS reading and writing techniques to different width tapes. Whilst a greater width tape inherently provides more storage capacity due to the increased surface area available, tape drives and in particular their guide assemblies are currently limited to a single tape cartridge size that holds tape of a predetermined width, which requires that a new tape drive be produced for each different tape width. Not only does this mean increased expense for the user, it also means that existing tapes would not be compatible with the new drives and would require the user to transfer any existing stored data to new tape media or, alternatively, to maintain two tape devices.

One problem faced with tape drives that attempt use of multiple tape widths is encountered during extraction of the tape from its cartridge. Typically, in order to allow a tape cartridge to be loaded into a tape drive, the non-deployed positions of the guides are normally designed so that the guides fit within a cavity 125 in the cartridge 110, when loaded, as is shown in FIG. 2b. The guides are then moved to their deployed positions. In the case of a single tape width, this arrangement is relatively simple to achieve as the height of the guides can be selected to fit the tape width (which the cartridge must inherently be high enough to hold). However, where a tape drive uses multiple tape widths, the height of the cartridge itself may vary, in which case a standard height for guides is not possible. If a tape guide was positioned in its non-deployed position to align itself with the top and bottom edges of the tape then it would be too high to fit in a cavity of a smaller cartridge shell. Alternatively, if a tape guide is dimensioned to avoid hitting the smaller cartridge shell, it would not engage the full width of a larger width tape in the deployed position.

In order to address this issue, various complex sensing arrangements have been suggested so that a predetermined height may be used for tape guides for each cartridge size so as to accommodate each tape width. However, such arrangements require additional mechanisms, sensors, and control systems and increase the complexity and cost of the tape drives. Where tape guides such as the pinch roller are lowered or raised into position after threading, clearance must be provided to allow the tape to be threaded over or under the tape guide.

Thus, a heretofore unaddressed need exists in the industry to address the aforementioned deficiencies and inadequacies.

SUMMARY

Embodiments of the present disclosure provide systems and methods for positioning a tape guide in a digital transfer apparatus. Briefly described, in architecture, one embodiment of the system, among others, can be implemented as follows. One embodiment of the system includes a rotary scanning drum having at least one scanning head and a tape cartridge positioning structure for positioning a magnetic tape cartridge containing the magnetic tape at a predetermined location with respect to a reference surface such that the magnetic tape contained therein projects above the reference surface by a distance proportional to the width thereof. Correspondingly, the system may be used with a first width magnetic tape having a first width and a second width magnetic tape having a second width, where the second width of the magnetic tape is less than the first width.

The system includes a tape guide system for guiding the magnetic tape. In use, the tape guide system is moved past the rotary scanning drum during a scanning process. The tape guide system includes a first tape guide and a guide ramp for the first tape guide, where the first tape guide has a free end and a guide surface that has a length corresponding substantially to the first width. The first tape guide also has a non-deployed position in which the free end projects above the reference surface a first distance that is not substantially greater than the distance by which the second width tape projects above the reference surface. The first tape guide is movable from the non-deployed position along a predetermined path to a deployed position at which the guide surface engages the magnetic tape for guiding the tape during the scanning process. The predetermined path comprises the ramp which is arranged to impart a vertical component to the movement, whereby at the deployed position, the free end projects above the reference surface a second distance which is greater than the first distance. Correspondingly, when the magnetic tape cartridge at the predetermined location contains the first width magnetic tape, the full length of the guide surface engages the magnetic tape.

Embodiment of the present disclosure can also be viewed as providing methods for positioning a tape guide in a digital transfer apparatus. In this regard, one embodiment of such a method, among others, can be broadly summarized by the following steps: providing the tape guide with a non-deployed position in which it is positioned relative to a reference surface on which a the tape cartridge is seated, such that the free end projects above the reference surface by a distance less than the second height; and providing a ramped guide track along which the tape guide is moved to a deployed position at which the tape guide is raised relative to the reference surface to a position at which the free end projects above the reference surface by a distance greater than the second height and at which the guide surface will extend along the desired line of engagement between the opposite edges of a first width tape, when a the tape cartridge containing a the first width tape is seated on the reference surface. The tape guide is raised during its movement to its deployed position. This means that the tape guide can be positioned out of the way in its non-deployed position to avoid conflict with different sized tape cartridge shells.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Embodiments of the present disclosure will now be described in detail by way of example only with reference to the accompanying drawings, in which.

DETAILED DESCRIPTION

Figure 1:
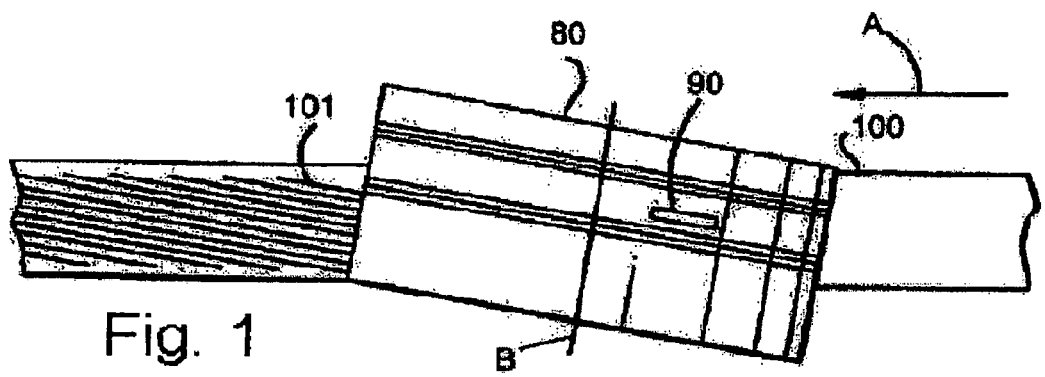
FIG. 1 is a schematic diagram of a prior art arrangement showing a portion of a tape deployed around a rotary scan head.
Figure 2:
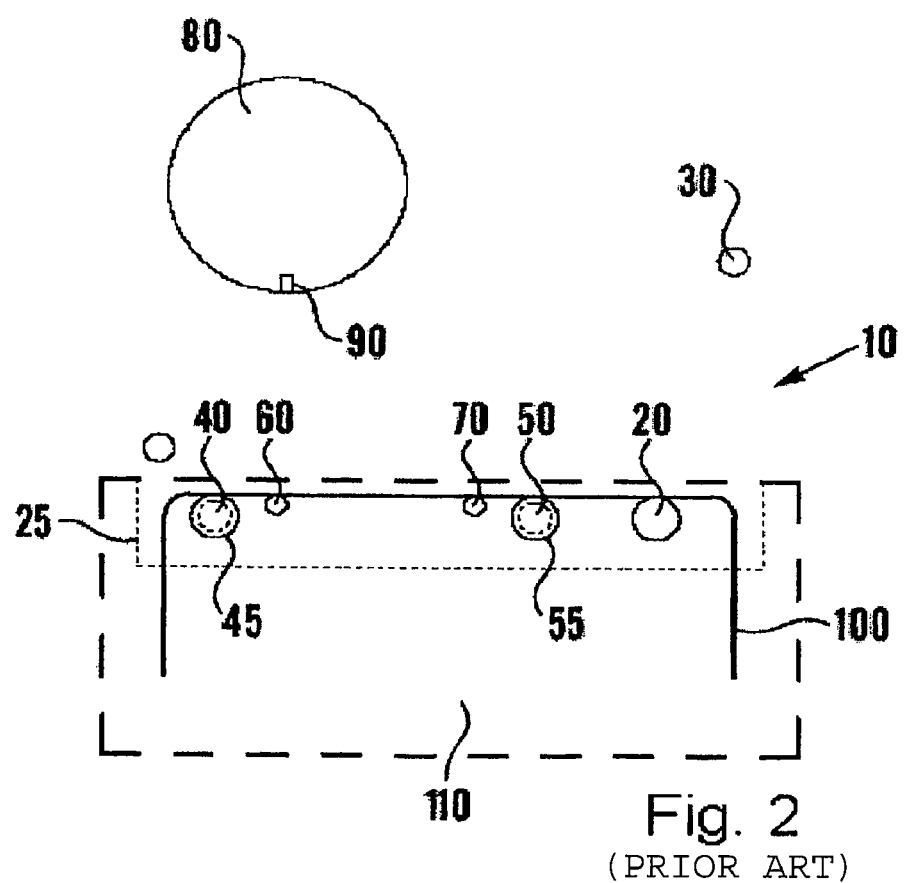
FIG. 2 is a schematic diagram of a prior art tape cartridge and guide assembly for a tape drive prior to deploying tape from the tape cartridge.
Figure 2A:
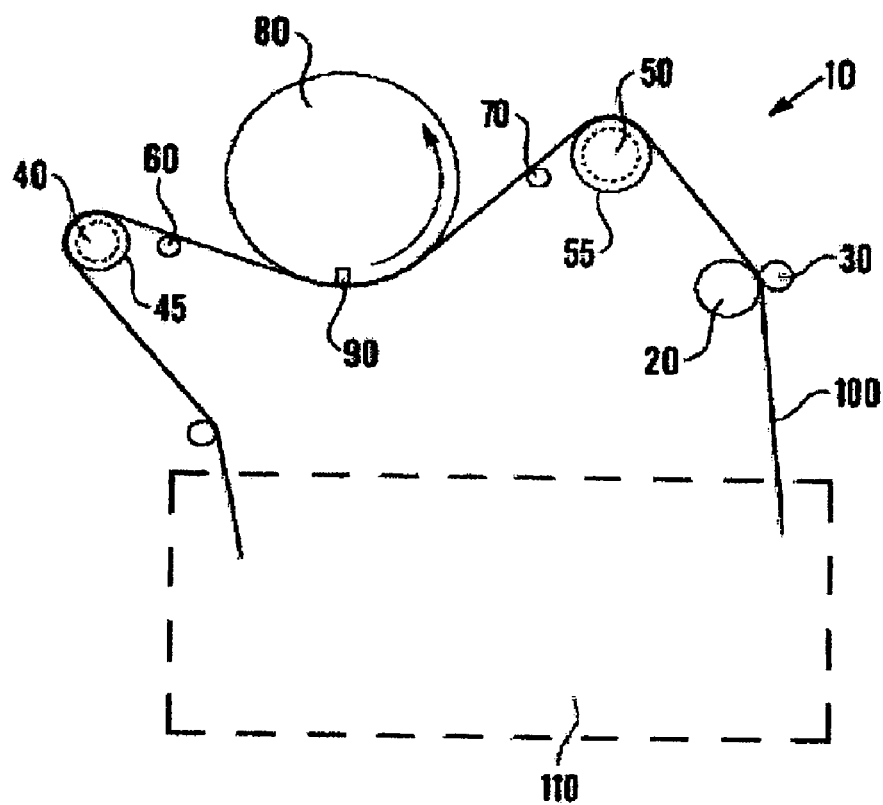
FIG. 2a is a schematic diagram of the assembly of FIG. 2 showing the tape cartridge and guide assembly when the tape is deployed.
Figure 2B:
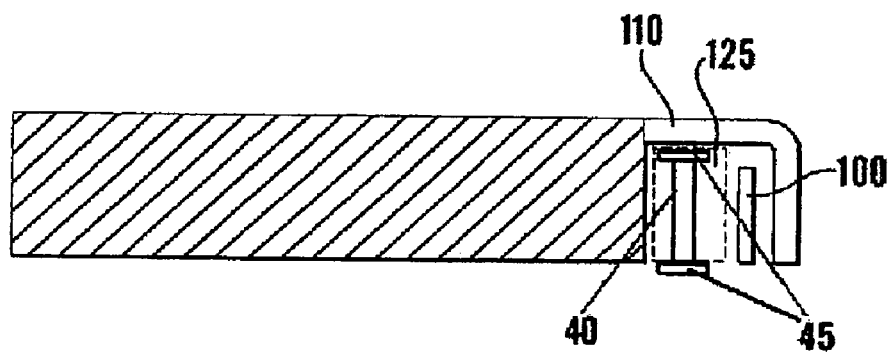
FIG. 2b is a sectional side view of a tape cartridge and tape guide.

Various embodiments of the present disclosure provide a magnetic tape data transfer apparatus for use with a first width magnetic tape having a first width and a second width magnetic tape having a second width, where the second width of the magnetic tape is less than the first width. One embodiment of the apparatus includes a rotary scanning drum having at least one scanning head and a tape cartridge positioning structure for positioning a magnetic tape cartridge containing the magnetic tape at a predetermined location with respect to a reference surface such that the magnetic tape contained therein projects above the reference surface by a distance proportional to the width thereof. The apparatus further includes a tape guide system for guiding the magnetic tape. In use, the tape guide system is moved past the rotary scanning drum during a scanning process. The tape guide system includes a first tape guide and a guide ramp for the first tape guide, where the first tape guide has a free end and a guide surface that has a length corresponding substantially to the first width. The first tape guide also has a non-deployed position in which the free end projects above the reference surface a first distance that is not substantially greater than the distance by which the second width tape projects above the reference surface. The first tape guide is movable from the non-deployed position along a predetermined path to a deployed position at which the guide surface engages the magnetic tape for guiding the tape during the scanning process. The predetermined path comprises the ramp which is arranged to impart a vertical component to the movement, whereby at the deployed position, the free end projects above the reference surface a second distance which is greater than the first distance. Correspondingly, when the magnetic tape cartridge at the predetermined location contains the first width magnetic tape, the full length of the guide surface engages the magnetic tape.

The present disclosure also includes embodiments of a magnetic tape data transfer apparatus for use with a first width magnetic tape having a first width and a second width magnetic tape having a second width that is less than the first width. The apparatus includes a rotary scanning drum having at least one scanning head; a tape cartridge positioning device for positioning a magnetic tape cartridge containing the magnetic tape at a predetermined location with respect to a reference surface such that the magnetic tape contained therein projects above the reference surface by a distance proportional to the width thereof; and a tape guide system for guiding the magnetic tape. The tape guide system is moved past the rotary scanning drum during a scanning process.

The tape guide system comprises a first tape guide means and a raising means for the first tape guide means, where the first tape guide means has a free end and a guide surface. The first tape guide means has a non-deployed position in which the free end projects above the reference surface a first distance that is not substantially greater than the distance by which the second width tape projects above the reference surface. The first tape guide means is movable from the non-deployed position along a predetermined path to a deployed position at which the guide surface engages the magnetic tape for guiding the tape during the scanning process. The predetermined path comprises the raising means, which is arranged to impart a vertical component to the movement along the predetermined path. At the deployed position, the free end projects above the reference surface a second distance which is greater than the first distance, such that when the magnetic tape cartridge at the predetermined location contains a the first width magnetic tape, the guide surface fully engages the magnetic tape along a line extending between opposite edges of the guide tape.

The present disclosure also includes embodiments of a method of positioning a tape guide in a digital data transfer apparatus configured for use with a first width tape having a first width and contained in a tape cartridge having a predetermined first height and a second width tape having a second width. The second width is less than the first width and contained in a tape cartridge having a predetermined second height. The tape guide has a free end and a guide surface with a length corresponding substantially to a length of a desired line of engagement of the guide surface with the first width tape, when the first width tape and tape guide are in respective deployed conditions. The line of engagement also extends between opposite edges of the first width tape. The method includes the steps of providing the tape guide with a non-deployed position in which it is positioned relative to a reference surface on which a the tape cartridge is seated, such that the free end projects above the reference surface by a distance less than the second height; and providing a ramped guide track along which the tape guide is moved to a deployed position at which the tape guide is raised relative to the reference surface to a position at which the free end projects above the reference surface by a distance greater than the second height and at which the guide surface will extend along the desired line of engagement between the opposite edges of a first width tape, when a the tape cartridge containing a first width tape is seated on the reference surface. The tape guide is raised during its movement to its deployed position. This means that the tape guide can be positioned out of the way in its non-deployed position to avoid conflict with different sized tape cartridge shells.

Various embodiments of the present disclosure seek to provide a tape guide system for a tape drive that allows a tape guide to engage different tape widths for reading/writing by the drive. By providing a tape guide that can be used for different widths of tape, wider tapes can be used, providing a greater surface area for storing data and thus greater storage capacity. At the same time as allowing wider tapes (for example 6 mm, 8 mm, and/or 10 mm width tapes), existing tape widths (typically of 4 mm widths) can also be used, meaning that the new drive would also be compatible with any existing media used.

Embodiments of the present disclosure may include a tape guide system for supporting magnetic tape about a rotary scan drum of a data transfer apparatus, where the tape guide system comprises a tape guide and a guide ramp. The tape guide has a supporting surface for supporting the magnetic tape in the tape guide's deployed position and has a non-deployed position in which the supporting surface is spaced from and non-aligned with a surface of the tape to be supported. The tape guide is arranged to be driven relative to the guide ramp towards the deployed position with a horizontal movement component, thereby causing the guide ramp to impart a vertical movement to the tape guide and, in the deployed position, substantially align at least part of the supporting surface of the tape guide with the surface of the tape to be supported.

Embodiments of the present disclosure may include a tape guide system including tape guide means for guiding magnetic tape deployed around a rotary scan drum of a data transfer apparatus and ramp means in communication with the tape guide means for imparting a vertical movement component to the tape guide means, when the tape guide means is imparted with a horizontal movement component to thereby raise the tape guide from a non-deployed position to a deployed position to engage the tape. In one advantageous embodiment, the drive used for horizontal movement of conventional tape guides within the tape drive can also be used to drive a tape guide system according to the present disclosure. In this manner, a tape guide system according to an embodiment of the present disclosure can be cheaply and relatively simply implemented in tape drives without the need for additional drive systems or the like.

Embodiments of the present disclosure may include a tape guide system including mounting means for connecting to a tape guide and ramp means in communication with the mounting means for raising the tape guide from a non-deployed position to an deployed position to engage a tape. Embodiments of the present disclosure may utilize a method of moving a tape guide from a non-deployed position to an deployed position in a tape drive comprising the step of moving the tape guide relative to a ramp during deployment of a tape in the tape drive to align a supporting surface of the tape guide with a surface of the tape to be supported when the tape is in its deployed position.

Embodiments of the present disclosure may include a rotary scan magnetic tape data transfer apparatus comprising a tape guide system and a drive for moving one or more tape guides of the tape guide system from a non-deployed position to an deployed position to engage a tape. The drive is arranged to move the tape guide relative to the guide ramp between a non-deployed position and a deployed position to engage the tape guide to the tape. Embodiments of the present disclosure may further include a magnetic tape rotary scan data transfer apparatus comprising a rotary scan drum for reading from and writing to magnetic tape; a tape guide system for supporting magnetic tape around the rotary scan drum; and a drive for moving tape deployment guides in a plane from a non-deployed position to a deployed position to deploy at least a portion of the tape around at least part of a rotary scan drum. The tape guide system comprises a tape guide and a guide ramp, where the tape guide has a supporting surface for supporting the magnetic tape in the tape guide's deployed position and has a non-deployed position in which the supporting surface is spaced from and non-aligned with a surface of the tape to be supported. The tape guide is arranged to be driven by the drive relative to the guide ramp towards the deployed position with a horizontal movement component, thereby causing the guide ramp to impart a vertical movement to the tape guide and substantially align at least part of the supporting surface of the tape guide with the surface of the tape to be supported.

Figure 3:
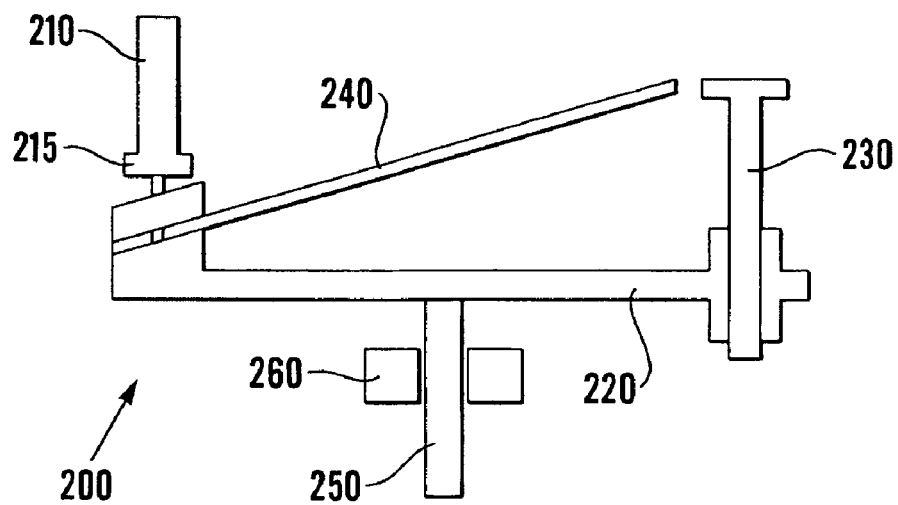
FIG. 3 is a sectional view of a tape guide system according to an embodiment of the present disclosure.

FIG. 3 is a sectional view of a tape guide system according to an embodiment of the present disclosure. A tape guide system 200 for a magnetic tape data transfer apparatus (tape drive) for use with multiple width tapes includes an arm 220 which is connected about a shaft 230 to allow the arm 220 to rotate about the shaft 230. The arm 220 is connected to a guide post 210 and is also mounted relative to a guide ramp 240 that extends substantially between a non-deployed position and a deployed position for the guide post. The guide ramp 240 is fixed so that it does not rotate with the arm. The arm 220 also includes a pin 250 that engages with a drive 260 allowing the drive 260 to move the arm 220 and therefore the guide post 210. The guide ramp 240 could be formed by a slot or a track in an inclined surface. Alternatively, the guide ramp 240 could be a solid element having a uniform cross-section that the arm 220 is mated around or with.

Figure 4:
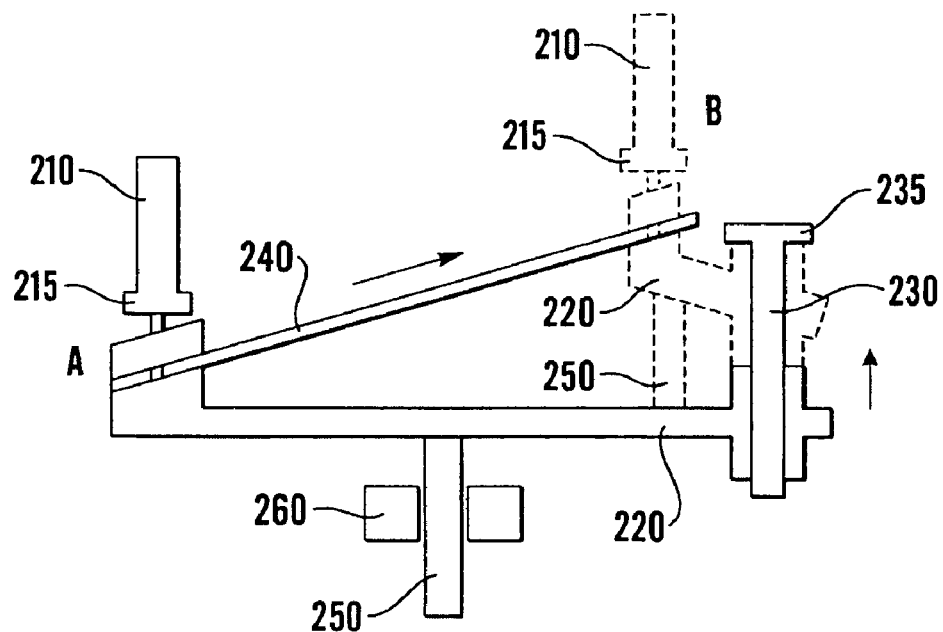
FIG. 4 is a sectional view showing the tape guide system of FIG. 3 in deployed and non-deployed positions.

FIG. 4 is a diagram showing the tape guide system 200 of FIG. 3 in a non-deployed (start) position and a deployed (finish) position. The tape guide system 200 is shown in its non-deployed position (labeled A) as solid lines and in its deployed position (labeled B) as dotted lines. During a tape deployment process, the drive 260 is operated such that it moves the pin 250, which in turn rotates the arm 220 about the shaft 230. As the arm 220 rotates, it is forced up the guide ramp 240. The pin 250 has a length such that it remains within the drive 260 even when the arm 220 is raised to the highest point of the guide ramp 240. The arm 220 is mounted for axial movement relative to the shaft 230 but is prevented from leaving the shaft by a stop 235.

Figure 5:
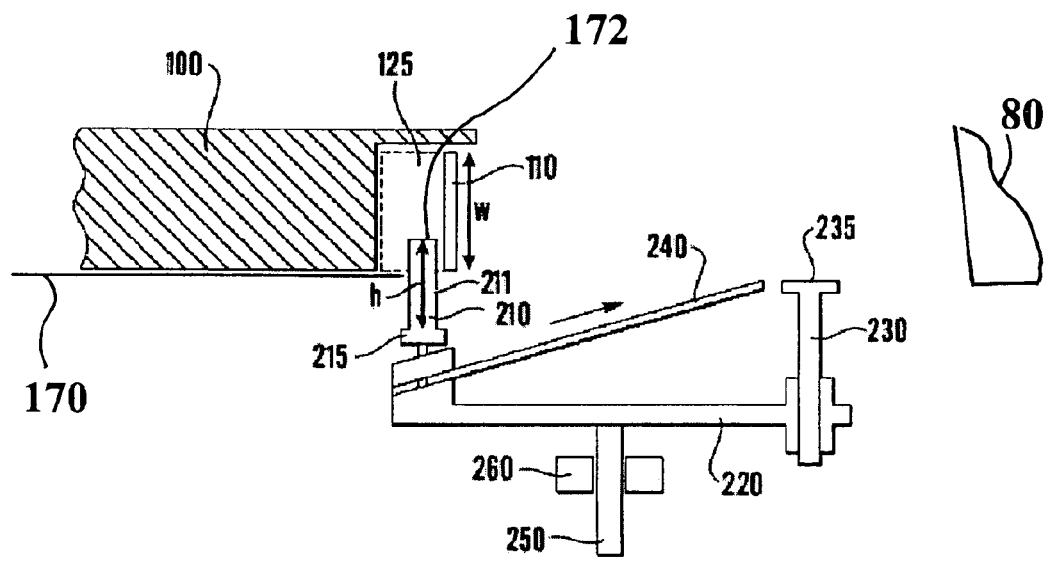
FIG. 5 is the diagram of FIG. 4 with the addition of a tape cartridge.
Figure 6:
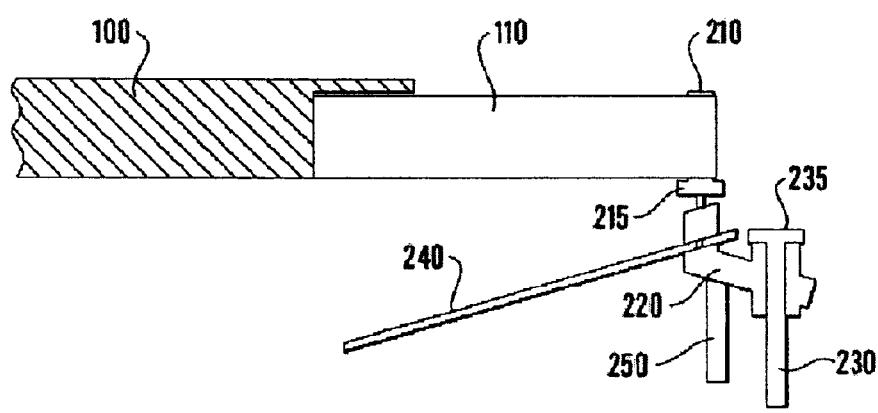
FIG. 6 is the tape guide system of FIG. 3 engaging a tape of a first width; and, FIG. 7 is the tape guide system of FIG. 3 engaging a tape of a second width.

FIGS. 5 and 6 show the tape guide system in use in a tape drive. The tape drive is configured to handle tape cartridges 100 containing a relatively wider tape 110 and cartridges 100' containing relatively narrow tape 110' (shown in FIG. 7). The tape drive comprises a tape cartridge positioning device (not shown) that locates the tape cartridges 100, 100' at a predetermined location with respect to a reference surface 170 and the tape guide system 200. The cartridge positioning device may be of any suitable known type.

In this embodiment, the reference surface 170 is a surface of the tape cartridge positioning device that supports the underside of the tape cartridge 100. The arrangement is such that the free end 172 of the tape guide 210 projects above the reference surface a predetermined distance that is not substantially greater than the distance by which the narrower tape 110' projects above the reference surface. The respective distances by which the tapes 100, 100' project above the reference surface 170 are proportional to the width (w) of the tape and will be known for each width of the tape the tape drive is designed to receive.

As shown in FIG. 5, in its non-deployed position, the guide post 210 projects into a cavity 125 in the underside of the magnetic tape cartridge and is positioned behind the tape 100 in the direction of movement of the tape towards the rotary scanning drum 80. Thus, the guide post 210 is stationed between the rear, non-magnetic face of the magnetic tape and the pair of reels (not shown) on which the tape is held.

During a tape deployment process, movement of the drive 260 causes the pin 250 to move, which in turn rotates the arm 220 about the shaft 230. Rotation of the arm 220 raises the guide post 210 relative to the guide ramp 240 as it is moved onwards to its deployed position. As shown in FIG. 6, when the guide post 210 reaches its deployed position at the top of the ramp 240, the guide surface 211 of the guide post 210 is aligned with a surface of the tape to be supported.

In some embodiments, the guide post 210 is disposed such that in its non-deployed position and during movement to its deployed position, the guide surface 211 of the guide post 210 does not engage the tape; the guide surface only engages the tape when the tape and guide post are in a fully deployed position. The guide post is moved such that, during the deployment process in some embodiments, it follows some distance behind and spaced part from the tape being deployed.

Figure 7:
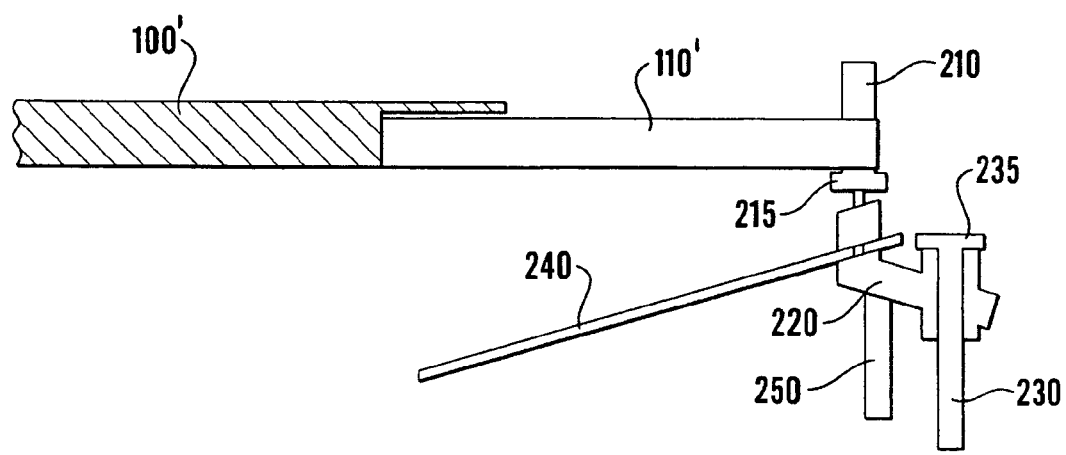

The length of the guide post 210, which in the embodiment corresponds to its vertical height (h), is selected to correspond to at least the width (w) of the largest tape to be used in the tape drive, and the height of the guide ramp 240 is selected so that the guide surface 211 accommodates the width (w) of the largest tape when the guide post 210 is in its deployed position (e.g., the height of the ramp is at least the width of the maximum size tape less that of the minimum size tape). In this manner, the largest width of tape is fully supported across its width by the guide surface of the guide post 210 when the guide post reaches its deployed position. This is shown in FIG. 6. As shown in FIG. 7, a smaller width tape 110' will also be fully supported across its width by the guide surface 211 when the guide post 210 reaches its deployed position.

Optionally, a flange 215 may be provided at the base and/or top of the guide post 210. As shown in FIGS. 6 and 7, the flange 215 at the base of the guide post 210 is arranged such that the lower edge of tapes of all widths are aligned with the base of the guide post 210 when it reaches its deployed position and no tape slips any lower.

Figure 8:
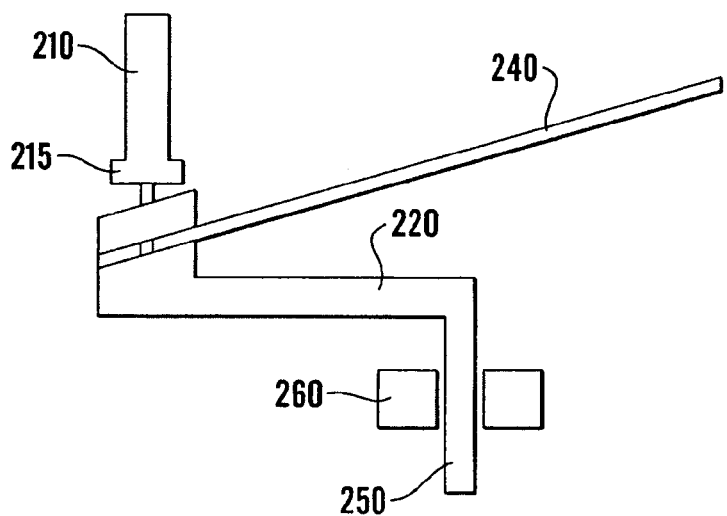
FIG. 8 is a sectional view of another embodiment according to the present disclosure.

As shown in FIG. 8, the shaft 230 is not essential and could be omitted. In such a case the arm 220 would be driven up the guide ramp 240 by the force applied by the drive 260 to the pin 250. Note that the arm is not essential and could also be omitted. In such a case the guide post 210 would be directly driven and connected to the pin 250.

Figure 9:
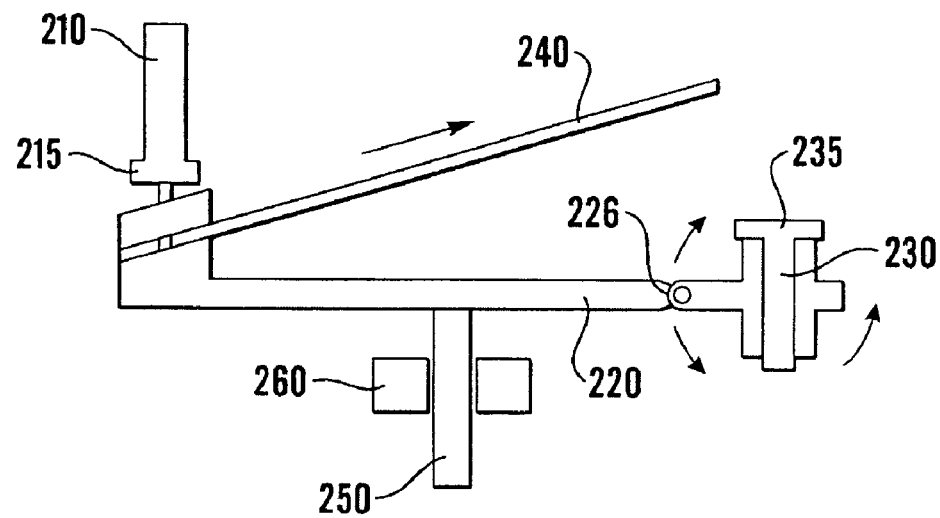
FIG. 9 is a sectional view of a further embodiment according to the present disclosure.

FIG. 9 is a sectional view of another embodiment of the tape guide system. In this embodiment, the arm 220 is fixed to prevent axial movement relative to the shaft 230, so that it can only rotate about the shaft 230. A flexible joint in the form of a pivotal hinge joint 226 is provided in the arm 220 to allow it to be raised or lowered.

Figure 10:
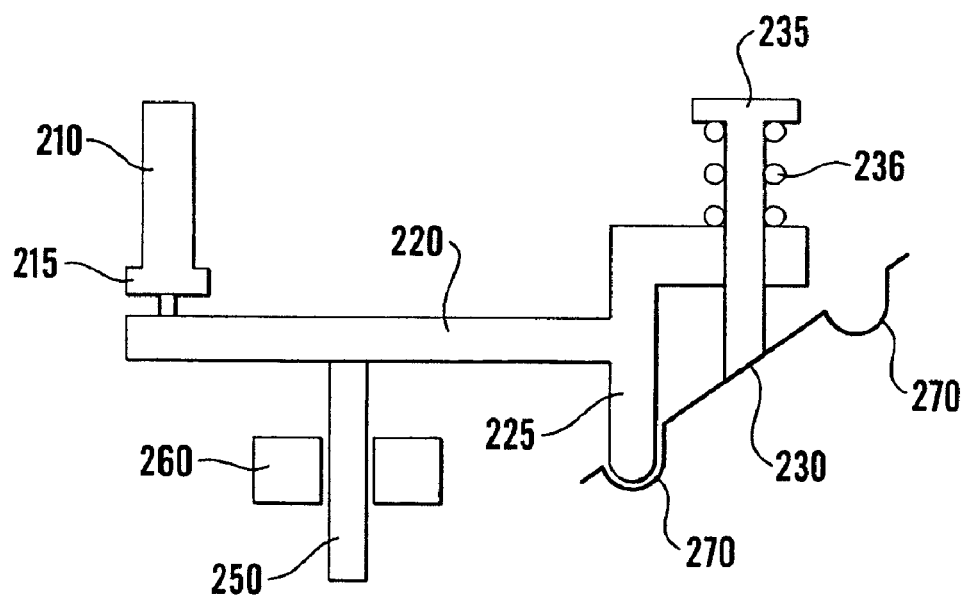
FIG. 10 is a sectional view of another embodiment according to the present disclosure.

FIG. 10 is a sectional view of another embodiment of the tape guide system. In this embodiment, the guide ramp is provided around a base of the shaft 230. The guide ramp is in the form of a slot 270 in the base member on which the shaft 230 is mounted. The slot 270 mates with a projecting portion 225 of the arm 220. The path of the slot 270 is ramped, so that as the arm 220 is driven about the shaft 230 by the pin 250, the portion 225 runs up the ramp in the slot 270 and raises the arm 220 and therefore the guide post 210. In some embodiments, a resilient element in the form of a spring 236, shown in this example as a coil spring, is positioned between the arm 220 and the stop 235. It will be appreciated that the spring 236 could also be used in the embodiments discussed with reference to FIGS. 3 to 7.

Figure 11:
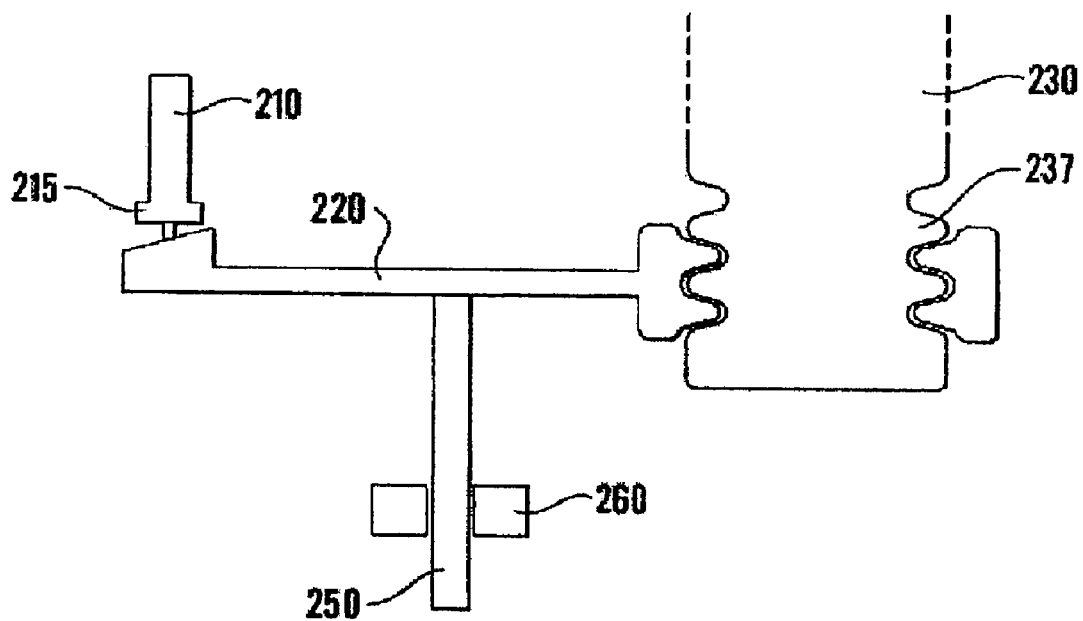
FIG. 11 is a sectional view of a further embodiment according to the present disclosure.

FIG. 11 is a sectional view of a further embodiment of the tape guide system. In this embodiment, the guide ramp is combined with the shaft 230 in the form of a screw thread 237. The arm 220 is connected around the screw thread 237 by an engagement thread, so that it travels up or down the thread as it is rotated from forces applied to the pin 250 by the drive 260. In some embodiments, a stop is provided at the end of the screw thread to prevent the arm 220 leaving the shaft 230.

From the aforementioned embodiments, it will be appreciated that the guide post discussed herein could be a static guide post, an inclined post, or a pinch roller. Indeed, it can be envisaged that tape guide assemblies could be produced in which some or all guide posts, inclined posts, and pinch roller(s) are mounted so as to be raised as they move from their non-deployed positions to their deployed positions. The guide posts do not need to have flanges, and this will depend on the type of guide post and widths of tape supported. Furthermore, not all of the guides need to be initially positioned beneath a cavity in a tape cartridge.

Although some embodiments have been discussed only in respect of two different tape widths, it will be apparent that the teachings of the present disclosure may be extended such that a greater number of tape widths can be accommodated. To this end, tape guides dedicated to tape widths intermediate the largest and smallest widths to be accommodated may be provided with intermediate height ramps. However, techniques of the present disclosure are sufficiently versatile such that tape widths less than an envisaged maximum width can be supported by a tape guide according to embodiment of the present disclosure without further modification. If a tape width greater than the maximum envisaged width is desired then the incline of the ramp and/or the deployed position may require adjustment, so that the tape guide is raised sufficiently to align the surface of the supporting surface 211 of the tape guide 210, so as to accommodate the whole width of the largest width tape.

In some embodiments, the guide post is arranged such that it extends perpendicular to the length of the magnetic tape when engaging the tape. In this case, the length/height of the guide surface need only be a small amount greater than the width of the largest width tape. If the guide post is to be inclined when it engages the tape such that its length is non-perpendicular to the length of the magnetic tape at the point of engagement, the length will need to be greater than the width of the largest width tape to ensure that the guide surface extends the full distance between opposite edges of the tape according to the angle at which it is designed to engage the tape.

It will be appreciated that although the deployed and non-deployed positions of the guide post 210 are shown as being at opposite ends of the ramp 240, it is possible that the guide post will be moved along planar paths at one or both ends of the path along which it travels when moving between the deployed and non-deployed positions. Furthermore, the ramp does not have to provide a linear lift. All that is necessary is that the guide post starts from the correct level and is raised sufficiently to engage the largest width tape fully between opposite edges thereof.

Although the above described embodiments relate to a tape guide system being arranged to raise a tape guide into a deployed position, it will be appreciated that the concepts discussed above could be implemented in an embodiment of the present disclosure, such that the tape guide is moved in any orientation (for example: lowered from above or moved across the tape drive from one side) and that references to upwards and downwards are used purely for ease of description and should not be taken as limiting.

The above described embodiments are intended to be illustrative and not restrictive. It should be emphasized that the above-described embodiments of the present disclosure are merely possible examples of implementations, merely set forth for a clear understanding of the principles of the present disclosure. Many variations and modifications may be made to the above-described embodiment(s) of the present disclosure without departing substantially from the spirit and principles of the present disclosure. All such modifications and variations are intended to be included herein within the scope of this disclosure and protected by the following claims.

Therefore, having thus described the invention, at least the following is claimed:

1. A magnetic tape data transfer apparatus for use with a first width magnetic tape having a first width and a second width magnetic tape having a second width that is less than said first width, said apparatus comprising:
   a rotary scanning drum having at least one scanning head;
   a tape cartridge positioning structure for positioning a magnetic tape cartridge containing said magnetic tape at a predetermined location with respect to a reference surface such that the said magnetic tape contained therein projects above said reference surface by a distance proportional to the said width thereof; and
   a tape guide system for guiding the magnetic tape, wherein, in use, said tape guide system is moved past said rotary scanning drum during a scanning process, said tape guide system comprising a first tape guide and a guide ramp for said first tape guide, said first tape guide having a free end and a guide surface that has a length corresponding substantially to said first width,
   said first tape guide having a non-deployed position in which said free end projects above said reference surface a first distance that is not substantially greater than said distance by which said second width tape projects above said reference surface and being movable from said non-deployed position along a predetermined path to a deployed position at which said guide surface engages the magnetic tape for guiding the tape during said scanning process, said predetermined path comprising said ramp which is arranged to impart a vertical component to said movement whereby at said deployed position said free end projects above said reference surface a second distance which is greater than said first distance such that when the magnetic tape cartridge at said predetermined location contains a said first width magnetic tape the full length of the guide surface engages the magnetic tape.

2. The apparatus as claimed in claim 1, further comprising a shaft having a major axis, wherein said first tape guide is connected for rotation about the axis of the shaft.

3. The apparatus as claimed in claim 1, wherein the tape guide is connected about the shaft by an arm, for movement relative to the shaft.

4. The apparatus as claimed in claim 3, wherein the guide ramp comprises a screw thread disposed about the shaft, the arm having an engagement thread for connection to the shaft around the screw thread.

5. The apparatus as claimed in claim 3, wherein the guide ramp at least partially surrounds the shaft, the arm including a mating portion arranged to mate with the guide ramp.

6. The apparatus as claimed in claim 5, wherein the guide ramp includes a slot for mating with the mating portion of the arm.

7. The apparatus as claimed in claim 3, wherein the arm is mounted for axial movement relative to the shaft.

8. The apparatus as claimed in claim 7, further comprising resilient means arranged to resiliently bias movement of the arm towards the ramp.

9. The apparatus as claimed in claim 8, wherein the resilient spring means comprises a helical spring mounted above the arm around the shaft.

10. The apparatus as claimed in claim 7, wherein the arm includes a flexible joint for allowing at least a part of the arm to be raised as it is driven along the ramp.

11. The apparatus as claimed in claim 10, wherein the flexible joint comprises a pivotal hinge joint.

12. The apparatus as claimed in claim 1, further comprising a drive for moving at least one further tape guide in a plane from a non-deployed position to a deployed position to deploy at least a portion of the magnetic tape around at least part of the rotary scanning drum, the tape guide system being connected to the drive for driving said first tape guide between said non-deployed and deployed position.

13. The apparatus as claimed in claim 1, wherein in said non-deployed position, said free end of the first tape guide projects into a cavity of a said tape cartridge located at said predetermined position.

14. The apparatus as claimed in claim 1, comprising a plurality of said first tape guides and respective said guides therefor.

15. The apparatus as claimed in claim 1, wherein said first tape guide is a pinch roller.

16. The apparatus as claimed in claim 1, wherein said guide ramp is arranged such that said vertical component of movement is substantially said first width less substantially said second width.

17. The apparatus as claimed in claim 1, wherein said first width and second width magnetic tapes project vertically above said reference surface by respective distances corresponding substantially to said first and second widths.

18. A magnetic tape data transfer apparatus for use with a first width magnetic tape having a first width and a second width magnetic tape having a second width that is less than said first width, said apparatus comprising:

a rotary scanning drum having at least one scanning head;

a tape cartridge positioning device for positioning a magnetic tape cartridge containing said magnetic tape at a predetermined location with respect to a reference surface such that an upper edge of a said second width tape contained in a said tape cartridge is at a predetermined height above said reference surface that is proportional to the said width thereof; and a tape guide system for guiding the magnetic tape, wherein when, in use, said tape guide system is moved past said rotary scanning drum during a scanning process, said tape guide system comprising a first tape guide means and a raising means for said first tape guide means, said first tape guide means having a free end and a guide surface, said first tape guide means having a non-deployed position in which said free end is at a height not higher than said predetermined height and being movable from said non-deployed position along a predetermined path to a deployed position at which said guide surface engages the magnetic tape for guiding the tape during said scanning process, said predetermined path comprising said raising means which is arranged to impart a vertical component to said movement along said predetermined path, whereby at said deployed position said free end is at a height above said predetermined height, such that when the magnetic tape cartridge at said predetermined location contains a said first width magnetic tape, the guide surface fully engages the magnetic tape along a line extending between opposite edges of the guide tape.

19. The apparatus as claimed in claim 18, wherein said raising means comprises a groove defined in a member and engagement means connected with said first tape guide means and engaging in said groove.

20. The apparatus as claimed in claim 18, wherein said raising means comprises an upwardly extending member provided with threading and support means for said first tape guide means that is provided with threading engaged with the threading of said upwardly extending member, whereby rotation of said support means with respect to said upwardly extending member generates said vertical component of movement.

21. The apparatus as claimed in claim 18, wherein said first tape guide means comprises flange means by which a lower edge of each of said first width and second width tape can be supported when the first said guide means is in said deployed position.

22. The apparatus as claimed in claim 18, wherein said height of said free end when the first tape guide means is in said non-deployed position is below said reference surface.

23. A method of positioning a tape guide in a digital data transfer apparatus configured for use with a first width tape having a first width and contained in a tape cartridge having a predetermined first height and a second width tape having a second width, which is less than said first width, and contained in a tape cartridge having a predetermined second height, said tape guide having a free end and a guide surface having a length corresponding substantially to a length of a desired line of engagement of said guide surface with said first width tape when said first width tape and tape guide are in respective deployed conditions, said line of engagement extending between opposite edges of said first width tape, said method comprising:

providing said tape guide with a non-deployed position in which it is positioned relative to a reference surface on which a said tape cartridge is seated such that said free end projects above said reference surface by a distance less than said second height; and providing a ramped guide track along which said tape guide is moved to a deployed position at which said tape guide is raised relative to said reference surface to a position at which said free end projects above said reference surface by a distance greater than said second height and at which said guide surface will extend along said desired line of engagement between said opposite edges of a first width tape when a said tape cartridge containing a said first width tape is seated on said reference surface.

* * * * *